United States Patent
Singhal et al.

(10) Patent No.: US 12,182,228 B1
(45) Date of Patent: Dec. 31, 2024

(54) CLUSTERING METHOD AND SYSTEM

(71) Applicant: DISTA TECHNOLOGY PRIVATE LIMITED, Pune (IN)

(72) Inventors: Akshay Kumar Singhal, Pune (IN); Deepak Garg, Pune (IN); Nishant Kumar, Pune (IN); Shishir Gokhale, Pune (IN)

(73) Assignee: DISTA TECHNOLOGY PRIVATE LIMITED, Pune (IN)

( * ) Notice: Subject to any disclaimer, the term of this patent is extended or adjusted under 35 U.S.C. 154(b) by 0 days.

(21) Appl. No.: 18/504,359

(22) Filed: Nov. 8, 2023

Related U.S. Application Data (63) Continuation of application No. 18/485,662, filed on Oct. 12, 2023.

(51) Int. Cl.
*G06F 18/23* (2023.01)
*G06T 17/05* (2011.01)

(52) U.S. Cl.
CPC .............. *G06F 18/23* (2023.01); *G06T 17/05* (2013.01)

(58) Field of Classification Search
CPC ................................ G06F 18/23; G06T 17/05
USPC .......................................................... 707/737
See application file for complete search history.

(56) References Cited

U.S. PATENT DOCUMENTS

| 7,085,650 B2 * | 8/2006 | Anderson ............... G06T 17/05 |
| | | 702/150 |
| 8,983,470 B1 | 3/2015 | Ryan et al. |
| 9,613,363 B2 * | 4/2017 | Cochran ............ G06Q 30/0261 |
| 10,437,863 B2 | 10/2019 | Metcalf-Putnam et al. |
| 2011/0213583 A1 * | 9/2011 | Mao ........................ G01S 19/37 |
| | | 707/E17.089 |

(Continued)

FOREIGN PATENT DOCUMENTS

| CN | 107547633 B | 9/2021 | |
| WO | WO 2016/086786 A1 * | 6/2016 | ............. G06F 17/30 |

(Continued)

OTHER PUBLICATIONS

Li, Jianqiang, et al., "Reducing Negative Transfer Learning via Clustering for Dynamic Multiobjective Optimization", IEEE Transactions on Evolutionary Computation, vol. 26, No. 5, Oct. 2022, pp. 1102-1116.*

(Continued)

*Primary Examiner* — Robert Stevens
(74) *Attorney, Agent, or Firm* — FisherBroyles, LLP; Susan M. Oiler (57) ABSTRACT

A system and a method to create clusters in an area are disclosed. Initially, a set of location data points associated with a plurality of user devices in an area and a defined block area are received. Further, a rectangular boundary is created by connecting a first reference point, a second reference point, a third reference point, and a fourth reference point identified based on a latitude and a longitude of each user (Continued)

device. Furthermore, a set of blocks are created by dividing the rectangular boundary based on the defined block area. The set of blocks are sorted based on a number of location data points present in each block. Subsequently, the set of blocks are reconfigured by determining a centroid of a plurality of location data points present in each block. Finally, a plurality of clusters is created in the area upon marking the reconfigured set of blocks.

16 Claims, 9 Drawing Sheets

(56) References Cited

U.S. PATENT DOCUMENTS

| | | | | |
|---|---|---|---|---|
| 2013/0165142 | A1* | 6/2013 | Huang | G01S 5/02524 455/456.1 |
| 2014/0143407 | A1* | 5/2014 | Zhang | H04L 67/00 709/224 |
| 2019/0120640 | A1* | 4/2019 | Ho | G01C 21/3461 |
| 2020/0019585 | A1* | 1/2020 | Balu | G06F 16/287 |
| 2020/0104755 | A1* | 4/2020 | Wolfson | G06N 20/00 |
| 2020/0107159 | A1* | 4/2020 | Pandit | G06Q 50/265 |
| 2020/0320108 | A1* | 10/2020 | Caroli | G06T 11/206 |
| 2021/0055117 | A1* | 2/2021 | Dong | G01C 21/3484 |
| 2023/0177337 | A1* | 6/2023 | Desai | G06N 3/092 706/25 |
| 2024/0126840 | A1* | 4/2024 | Singhal | G06T 17/05 |
| 2024/0152853 | A1* | 5/2024 | Singhal | G06Q 10/083 |
| 2024/0193531 | A1* | 6/2024 | Singhal | G06Q 10/083 |

FOREIGN PATENT DOCUMENTS

| | | | | |
|---|---|---|---|---|
| WO | | 2016124118 A1 | 8/2016 | |
| WO | WO 2019/128355 A1 * | | 7/2019 | H04L 29/06 |
| WO | WO 2022/095351 A1 * | | 11/2020 | G06F 16/29 |

OTHER PUBLICATIONS

Chang, Le, et al., "Edge Server Placement for Vehicular Ad Hoc Networks in Metropolitans", Internet of Things Journal, vol. 9, No. 2, Jan. 15, 2022, pp. 1575-1590.*

Cai, Yutong, et al., "Bicycle sharing station planning: From free-floating to geo-fencing", Transportation Research Part C: Emerging Technologies, vol. 147, Feb. 2023, 103990, pp. 1-24.*

Manjunath, Aishwarya, et al., "CARE-Share: A Cooperative and Adaptive Strategy for Distributed Taxi Ride Sharing", IEEE Transactions on Intelligent Transportation Systems, vol. 23, No. 7, Jul. 2022, pp. 7028-7044.*

Wang, Han, et al., "A Spatial Pattern Extraction and Recognition Toolbox Supporting Machine Learning Applications on Large Hydroclimatic Datasets", Remote Sensing, vol. 14, Issue 15, Aug. 2022, 18 pages.*

* cited by examiner

CLUSTERING METHOD AND SYSTEM

PRIORITY INFORMATION

The present application is a continuation of U.S. application Ser. No. 18/485,662, filed Oct. 12, 2023, which claims priority to Indian application No. 202221058707 filed Oct. 14, 2022.

TECHNICAL FIELD

The present subject matter described herein, in general, relates to clustering method and system. Particularly, the present subject matter describes a system and a method for creating an equal area clusters in a geographic area.

BACKGROUND

As enterprises are increasingly switching to direct selling models, i.e., providing products and services in non-retail settings, they are increasingly dependent on technologies for customer segmentation and distribution. For example, a food delivery service that caters to a large network of customers relies on conventional clustering models to group the customers into clusters for assigning food orders to the closest delivery agent. However, customer segmentation/clustering becomes all the more challenging when it comes to the real-time distribution of data points (customers/customer devices) that are constantly on the move, such as vehicles. This is because, the location of the vehicle in movement can be imprecise, which may lead to ambiguity in the clustering results. It must be noted that the conventional clustering models cluster data points without accounting for the dynamically changing location of the data points. Thus, real-time clustering and distribution of data points become challenging and inaccurate. Moreover, the conventional clustering models tend to create overlapping clusters in an area.

Further, the overlapping clusters may cause problems such as improper allocation. In the given example, the food delivery service may follow a time limit of 30 minutes to deliver an order from the time of receiving the order from a customer. However, the delivery executive may receive a notification to deliver food to an area that is quite far from the current location of the delivery executive. This may be because the clustering algorithm has improperly allocated the order to the agent due to an overlap in the clusters. In such cases, the delivery executive may fail to deliver the food within the time limit, leading to poor customer service.

SUMMARY

Before the present system(s) and method(s), are described, it is to be understood that this application is not limited to the particular system(s), and methodologies described, as there can be multiple possible embodiments which are not expressly illustrated in the present disclosures. It is also to be understood that the terminology used in the description is for the purpose of describing the particular implementations or versions or embodiments only and is not intended to limit the scope of the present application. This summary is provided to introduce aspects related to a system and a method for creating clusters in an area.

In one implementation, a method for creating clusters in an area is disclosed. Initially, a set of location data points associated with a plurality of user devices in an area and a defined block area are received. In one aspect, each location data point comprises a latitude and a longitude value of each user device of the plurality of user devices. Further, a first reference point, a second reference point, a third reference point, and a fourth reference point are identified based on the latitude and the longitude value of each user device. Furthermore, a rectangular boundary is created based on connecting the first reference point, the second reference point, the third reference point and the fourth reference point. In one aspect, the rectangular boundary encloses the set of location data points. Subsequently, the rectangular boundary is divided into a set of blocks based on the defined block area. In an aspect, each block from the set of blocks defines a cluster. Further, a number of location data points present in each block are determined. Upon determination, the set of blocks are sorted in a descending order based on the number of location data points present in each block. Further, each of the set of blocks are reconfigured based on determining a centroid of a plurality of location data points present in each block. In an aspect, the centroid is a point at the center of each block. Upon reconfiguration, each of the reconfigured set of blocks is marked as a fixed block or a floating block using an 80-20 hypothesis technique in order to generate a set of fixed blocks and a set of floating blocks. Further, a plurality of clusters in the area is created based on iteratively adjusting each floating block of the set of floating blocks by one of merging a floating block from the set of floating blocks with one of a fixed block based on the latitude and the longitude value of the location data points present in the floating block, or re-marking the floating block as the fixed block when the merging of the floating block with the fixed block exceeds the defined block area. In one aspect, the aforementioned method for integrating a widget in a third party application may be performed by a processor using programmed instructions stored in a memory.

In another implementation, a non-transitory computer program product having embodied thereon a computer program for creating clusters in an area is disclosed. The program may comprise a program code for receiving a set of location data points associated with a plurality of user devices in an area and a defined block area. In one aspect, each location data point comprises a latitude value and a longitude value of each user device of the plurality of user devices. Further, the program may comprise a program code for identifying a first reference point, a second reference point, a third reference point, and a fourth reference point based on the latitude value and the longitude value of each user device. Furthermore, the program may comprise a program code for creating a rectangular boundary based on connecting the first reference point, the second reference point, the third reference point and the fourth reference point. In one aspect, the rectangular boundary encloses the set of location data points. Subsequently, the program may comprise a program code for dividing the rectangular boundary into a set of blocks based on the defined block area. In an aspect, each block from the set of blocks defines a cluster. Further, the program may comprise a program code for determining a number of location data points present in each block. Upon determination, the program may comprise a program code for sorting the set of blocks in a descending order based on the number of location data points present in each block. Further, the program may comprise a program code for reconfiguring each of the set of blocks based on determining a centroid of a plurality of location data points present in each block. In an aspect, the centroid is a point at center of each block. Upon reconfiguration, the program may comprise a program code for marking each of the reconfigured set of blocks as a fixed block or a floating block using an 80-20 hypothesis technique in order to generate a set of fixed blocks and a set of floating blocks. Further, the program may comprise a program code for creating a plurality of clusters in the area based on iteratively adjusting each floating block of the set of floating blocks by one of merging a floating block from the set of floating blocks with one of a fixed block based on the latitude value and the longitude value of the location data points present in the floating block, or re-marking the floating block as the fixed block when the merging of the floating block with the fixed block exceeds the defined block area.

BRIEF DESCRIPTION OF THE DRAWINGS

The foregoing detailed description of embodiments is better understood when read in conjunction with the appended drawings. For the purpose of illustrating the present subject matter, an example is provided as figures, however, the invention is not limited to the specific method and system for creating clusters in an area is disclosed in the document and the figures.

The present subject matter is described in detail with reference to the accompanying figures. In the figures, the left-most digit(s) of a reference number identifies the figure in which the reference number first appears. The same numbers are used throughout the drawings to refer various features of the present subject matter.

The figures depict an embodiment of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Some embodiments of this disclosure, illustrating all its features, will now be discussed in detail. The words "receiving", "identifying," "creating," "dividing," "determining," "sorting," "reconfiguring," "marking," and other forms thereof, are intended to be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any system and methods similar or equivalent to those described herein can be used in the practice or testing of embodiments of the present disclosure, the exemplary, system and methods are now described.

The disclosed embodiments are merely examples of the disclosure, which may be embodied in various forms. Various modifications to the embodiment will be readily apparent to those skilled in the art and the generic principles herein may be applied to other embodiments. However, one of ordinary skill in the art will readily recognize that the present disclosure is not intended to be limited to the embodiments described, but is to be accorded the widest scope consistent with the principles and features described herein.

The present subject matter discloses a system and a method for creating clusters of data points in a geographic area. The data points refer to entities that form a cluster. The entities may be customers, addresses, objects, users, or enterprises. Conventional clustering algorithms create overlapping clusters in an area However, the overlapping clusters lead to improper allocation of data points when it comes to delivery services. The present invention discloses a technique for creating clusters in an area without overlap. Initially, a set of location data points and a defined block area are received. Further, a first reference point, a second reference point, a third reference point and a fourth reference point are determined based on the set of location data points. Furthermore, a rectangular boundary is created based on connecting the first reference point, the second reference point, the third reference point and the fourth reference point. The rectangular boundary is further divided into a set of blocks. The set of blocks are further reconfigured to create a plurality of clusters.

In one embodiment, the present invention may be configured to create clusters based on the defined block area. In other words, each cluster of the plurality of clusters have the same defined block area. Further, the present invention provides an optimized method of creating the clusters. Subsequently, each cluster from the plurality of clusters are reconfigured such that each cluster covers optimized number of location data points. The present invention uses 80-20 hypothesis technique for creating the clusters in the area.

It may be noted that the method and the system for creating clusters in an area is useful in customer segmentation and distribution. The system and the method of the present invention may be used in multiple sectors such as Fast-moving consumer goods (FMCG), logistics, banking, hyperlocal delivery services and the like.

While aspects of described system and method for creating clusters in an area may be implemented in any number of different computing systems, environments, and/or configurations, the embodiments are described in the context of the following exemplary system.

Figure 1:
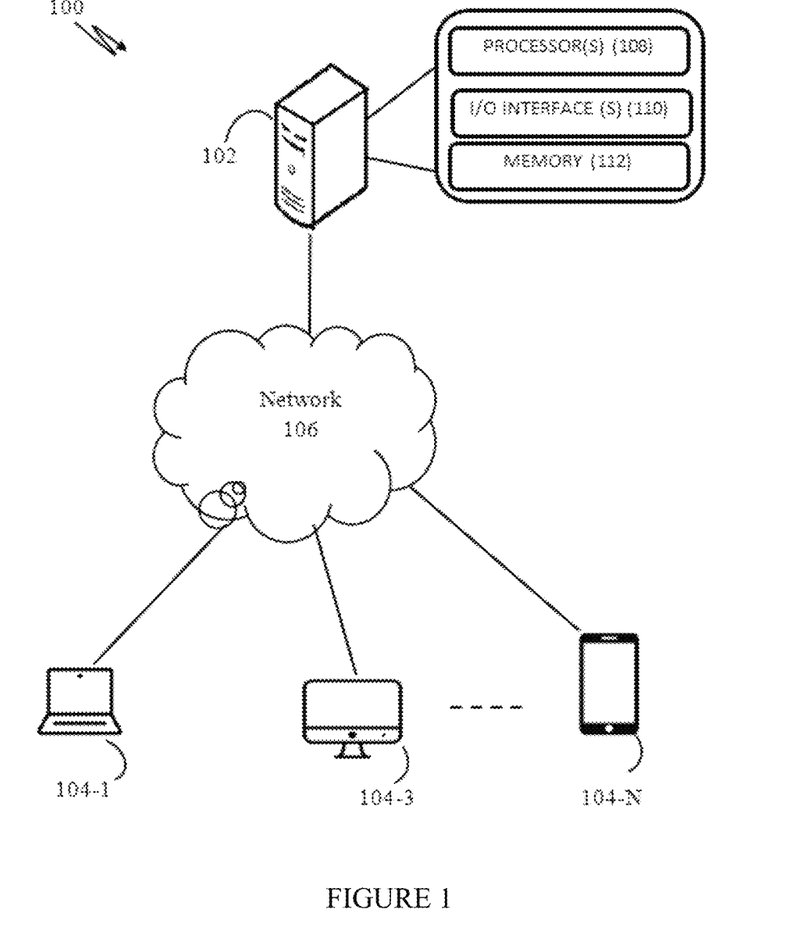
FIG. 1 illustrates a network implementation of a system for creating clusters in an area is disclosed, in accordance with an embodiment of the present subject matter.

Referring now to FIG. 1, a network implementation 100 of a system 102 for creating clusters in an area is disclosed. It may be noted that one or more users may access the system 102 through one or more user devices 104-1, 104-2 ... 104-N, collectively referred to as user devices 104, hereinafter, or applications residing on the user devices 104.

Although the present disclosure is explained considering that the system 102 is implemented on a server, it may be understood that the system 102 may be implemented in a variety of computing systems, such as a laptop computer, a desktop computer, a notebook, a workstation, a virtual environment, a mainframe computer, a server, a network server, a cloud-based computing environment. It will be understood that the system 102 may be accessed by multiple users through one or more user devices 104-1, 104-2 . . . 104-N. In one implementation, the system 102 may comprise the cloud-based computing environment in which the user may operate individual computing systems configured to execute remotely located applications. Examples of the user devices 104 may include, but are not limited to, a portable computer, a personal digital assistant, a handheld device, and a workstation. The user devices 104 are coupled to the system 102 for communications purposes through a network 106.

In one implementation, the network 106 may be a wireless network, a wired network, or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 106 may include a variety of network devices, including routers, bridges, servers, computing devices, storage devices, and the like.

In one embodiment, the system 102 may include at least one processor 108, an input/output (I/O) interface 110, and a memory 112. Processors 108 may be implemented as one or more microprocessors, microcomputers, microcontrollers, digital signal processors, Central Processing Units (CPUs), state machines, logic circuitries, and/or any devices that manipulate signals based on operational instructions. Among other capabilities, the at least one processor 108 is configured to fetch and execute computer-readable instructions stored in the memory 112.

The I/O interface 110 may include a variety of software and hardware interfaces, for example, a web interface, a command line interface, a graphical user interface, and the like. The I/O interface 110 may allow the system 102 to interact with the user directly or through the client devices 104. Further, the I/O interface 110 may enable the system 102 to communicate with other computing devices, such as web servers and external data servers (not shown). The I/O interface 110 can facilitate multiple communications within a wide variety of networks and protocol types, including wired networks, for example, LAN, cable, etc., and wireless networks, such as WLAN, cellular, or satellite. The I/O interface 110 may include one or more ports for connecting a number of devices to one another or to another server.

The memory 112 may include any computer-readable medium or computer program product known in the art including, for example, volatile memory, such as static random access memory (SRAM) and dynamic random access memory (DRAM), and/or nonvolatile memory, such as read only memory (ROM), erasable programmable ROM, flash memories, hard disks, Solid State Disks (SSD), optical disks, and magnetic tapes. The memory 112 may include routines, programs, objects, components, data structures, etc., which perform particular tasks or implement particular abstract data types. The memory 112 may include programs or coded instructions that supplement applications and functions of the system 102. In one embodiment, the memory 112, amongst other things, serves as a repository for storing data processed, received, and generated by one or more of the programs or the coded instructions.

As there are various challenges observed in the existing art, the challenges necessitate the need to build the system 102 for integrating a widget in a third party application. At first, a user may use the user device 104 to access the system 102 via the I/O interface 110. The user may register the user devices 104 using the I/O interface 110 in order to use the system 102. In one aspect, the user may access the I/O interface 110 of the system 102. The detail functioning of the system 102 is described below with the help of figures.

The present subject matter describes the system 102 for creating clusters in an area. Initially, the system 102 may receive a set of location data points associated with a plurality of user devices in a geographic area. Further, each location data point comprises a latitude value and a longitude value of each user device of the plurality of user devices. In one aspect, the latitude value and the longitude value may indicate geographic coordinates of each user device. Subsequently, the system 102 also receives a defined block area which is a target size of each newly formed cluster. The defined block area may be received in any unit of distance such as square kilometre ($Km^2$), square metre ($m^2$), square feet ($ft^2$), etc. In one example, the defined block area may be 4 $km^2$. 8 $km^2$ and the like.

In one embodiment, the defined block area may be received by the system. In another embodiment, the system may calculate the defined block area based on a Machine Learning Algorithm. The Machine Learning Algorithm may be trained based on training data that comprises an area of clusters present in multiple cities. In an aspect, the training data may comprise historical data associated with historical clusters, an area of historical clusters present in multiple geographical areas. Further, the machine learning algorithm may be continuously updated based on feedback, received from the user, related to at least the area of cluster.

Figure 2A:
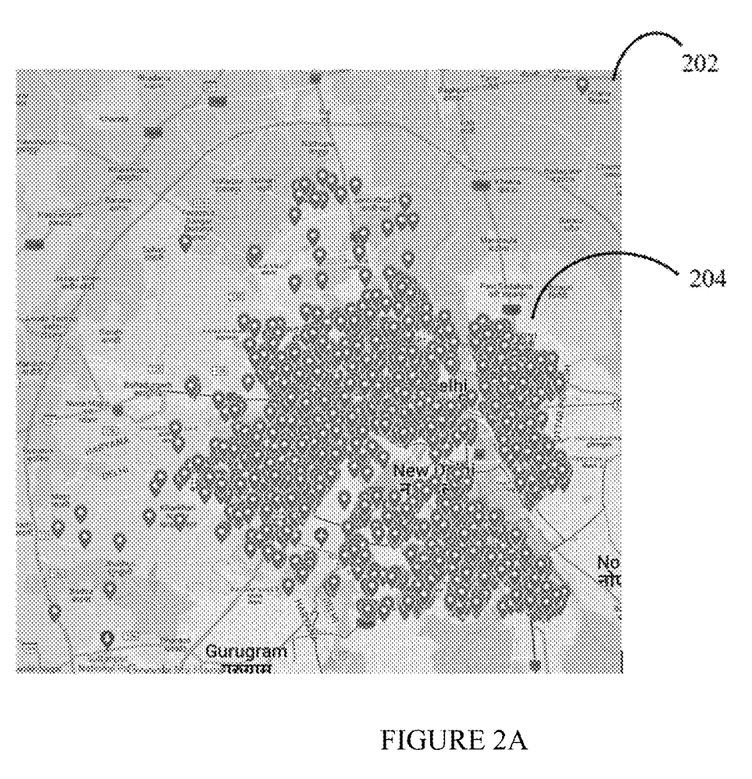
FIG. 2A shows a set of location data points in an area, in accordance with an embodiment of the present subject matter.

Referring now to FIG. 2A, the set of location data points in the area are shown, in accordance with an embodiment of the present subject matter. In one example, the area 202 may be a geographical area covering the city of New Delhi. Further, a location data point 204 corresponding to each user device of the plurality of user devices are shown. The location data point 204 may comprise the latitude value and the longitude value to mark the geographic location of the data point.

Referring again to FIG. 1, upon receiving the location data points, the system 102 may identify a maximum latitude value, a maximum longitude value, a minimum latitude value and a minimum longitude value based on an analysis of the set of location data points. In one aspect, the system 102 may analyze the latitude and the longitude values of each location data point in order to identify the maximum latitude value, the maximum longitude value, the minimum latitude value and the minimum longitude value. Upon identification of these values, the system 102 may determine a set of reference points to mark a boundary. For example, the system may determine a geographic point in the area which has its coordinate as the identified minimum latitude value and the identified minimum longitude value as a first reference point. Further, the system 102 may determine a geographic point in the area which has its coordinate as the identified minimum latitude value and the identified maximum longitude value as a second reference point. The system 102 further may determine a geographic point in the area which has its coordinate as the identified maximum latitude value and the identified maximum longitude value as a third reference point. Similarly, the system 102 may determine a geographic point in the area which has its coordinate as the identified maximum latitude value and the identified minimum longitude value as a fourth reference point. It must be noted that the reference points may be determined in any order.

In one example, the identified minimum latitude may be 23.67, the minimum longitude may be 48.34, the maximum latitude may be 89.45, and the maximum longitude may be 87.64. In the example, the first reference point is a geographic point having a coordinate value of minimum latitude 23.67 and minimum longitude 48.34. The second reference point is a geographic point having a coordinate value of minimum latitude 23.67, and maximum longitude 87.64. The third reference point is a geographic point having a coordinate value of maximum latitude 89.45, and maximum longitude 87.64. The fourth reference point is a geographic point having a coordinate value of maximum latitude 89.45, and minimum longitude 48.34.

Once the first reference point, the second reference point, the third reference point and the fourth reference point are identified, the system 102 may create a rectangular boundary based on connecting the reference points. In an aspect, the system 102 may connect the first reference point with the second reference point and the fourth reference point, and the third reference point with the second reference point and the fourth reference point in order to create the rectangular boundary. The rectangular boundary may enclose the set of location data points.

Figure 2B:
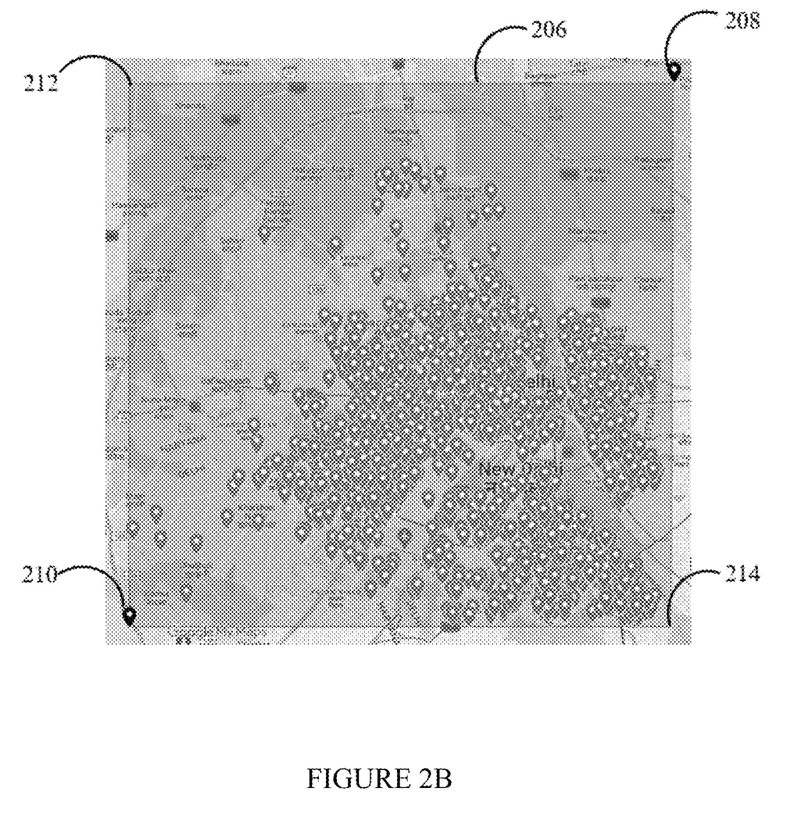
FIG. 2B shows a creation of a rectangular boundary, in accordance with an embodiment of the present subject matter.

Referring to FIG. 2B, a creation of the rectangular boundary is shown, in accordance with an embodiment of the present subject matter. In one embodiment, the system 102 may identify the first reference point 210 and the third reference point 208 based on the minimum latitude value and the maximum latitude value, and the minimum longitude value and the maximum longitude value. Upon identification of the first reference point 210 and the third reference point 208, the system 102 may determine the second reference point 214 and the fourth reference point 212. Further, the system 102 may connect the first reference point 210 with the second reference point 214 and the fourth reference point 212. Furthermore, the system 102 may connect the third reference point 208 with the second reference point 214 and the fourth reference point 212. Based on connecting these reference points, the system 102 may create the rectangular boundary 206.

Referring again to FIG. 1, the system 102 may divide the rectangular boundary into a set of blocks based on the defined block area. Each block from the set of blocks defines a cluster. In one embodiment, the system may start creating the set of blocks from the first reference point. The system 102 may use the defined block area to create the set of blocks starting from the first reference point. In an embodiment, the defined block area should be less than an area of the rectangular boundary. In an example, let us assume that the area of the rectangular boundary is 1200 Km². Further, the defined block area of 16 Km².

Figure 2C:
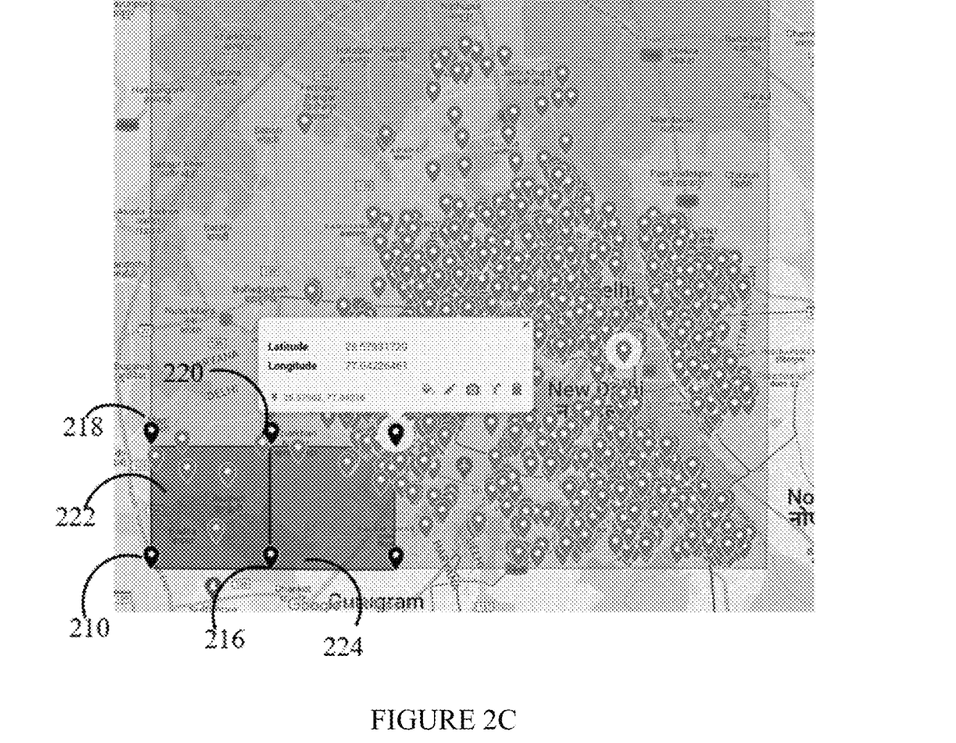
FIG. 2C shows a creation of a set of blocks, in accordance with an embodiment of the present subject matter.

Referring now to FIG. 2C, a creation of the set of blocks is shown, in accordance with an embodiment of the present subject matter. In one embodiment, the system 102 may identify four cluster points such as a cluster point A (210), a cluster point B (216), a cluster point C (220) and a cluster point D (218). The cluster point A (210) is the first reference point (210) in FIG. 2B. The cluster points B, C, and D (216, 220, 218) may be determined based on the first reference point (210) and the defined block area. Further, the system 102 may create a new block A (222) using the four cluster points A, B, C, and D. In one example, the defined block area may be 16 Km². Further, the system 102 may determine a distance of each side of the block as 4 KM. Subsequently, the using the first reference point 210 as reference, the cluster point B (216), the cluster point C (220) and the cluster point D (218) are determined as points at a 4 km distance from the reference point 210 along a square area. The four cluster points may then be connected to form the block A 222 having area of 16 km².

Similarly, the system 102 may create a second block B 224 using the cluster point C 220 as the reference point (i.e., Cluster point A). Further, the system 102 may identify remaining points such as cluster point B, cluster point C, and cluster point D for the block B 224 based on the defined block area. Further, the system 102 may iteratively create a block C, a block D and so on until the remaining area of the rectangular boundary is fully covered.

Referring again to FIG. 1, the system 102 may determine a number of location data points present in each block from the set of blocks. The number of location data points may be determined based on determining the latitude and the longitude of each location data point from the set of location data points. Further, the system may check if the determined latitude and the longitude of each location data point is between the latitude and longitude of the first reference point and the third reference point associated with the block. In an aspect, the system 102 may determine whether each location data point has its latitude between the minimum latitude and the maximum latitude values associated with the block, and its longitude between the minimum longitude and the maximum longitude values associated with the block. In one embodiment, each block from the set of blocks may comprise different number of location data points. In one example, the block A may comprise 28 location data point, and the system may determine the location data points by checking the latitude and longitude of each location data points from the 28 location data points is between the latitude and longitude of the first reference point and the third reference point of the block A. In another example, the block B may comprise 16 location data points, the block C may comprise 5 location data points, and the like.

Upon determining the number of location data points, the system 102 may sort the set of blocks based on the number of location data points present in each block. The sorting may be performed in descending order. In an aspect, the block having maximum number of location data points may be referred as a first block, and the block having minimum number of location data points may be referred as a last block. In one example, the block A may comprise 10 location data points, the block B may comprise 34 location data points, the block C may comprise 2 location data points, and the like. In an example, let's assume that block B has the maximum number of location data points, and block C has the minimum number of location data points.

Figure 3A:
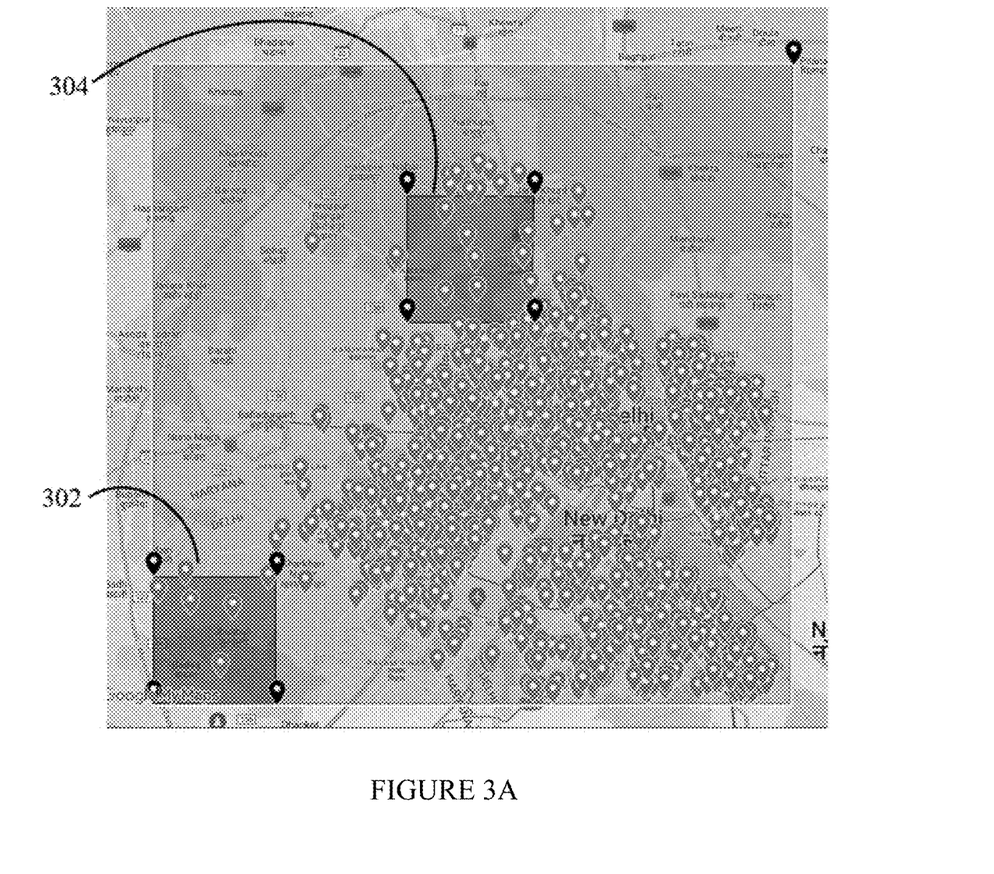
FIG. 3A shows determination of a number of location data points in a set of blocks, in accordance with an embodiment of the present subject matter.

Referring to the example in FIG. 3A, there are two blocks block 301 and block 302 in a given geographic area. The system 102 may check the number of location data points in each of block 301 and block 302. In the aspect, the block 301 may comprise 5 location data points. Further, the block 302 may comprise 14 location data points. Subsequently, the system 102 may sort the block 301 and the block 302 based on the number of location data points present in each block.

Referring again to FIG. 1, once the sorting is performed, the system 102 may reconfigure each of the set of blocks. The reconfiguration may be performed in order to remove an empty space present in each block. The reconfiguration may correspond to changing boundaries of each block from the set of blocks in order to remove the empty space. In one aspect, the reconfiguration may be done to better utilize the space of the set of blocks. The reconfiguration may be based on distribution of the location data points associated with each block from the set of blocks. The reconfiguration may help to remove the bias with which the set of blocks are created. In one embodiment, the reconfiguration may be performed using a Pythagoras theorem. The reconfiguration may be based on determining a centroid of a plurality of location data points present in each block. The centroid may be a point at the center of each block. The centroid of the plurality of location data points may be determined using at least one of, but not limited to, a haversine distance function, a Road Distance function or a Euclidean algorithm. Further, the system 102 may create diagonals through the centroid. The creation of the diagonals may be based on the defined block area. Upon creation of the diagonals, the system 102 may create a reconfigured block based on connecting end points of the diagonals. In one aspect, the reconfiguration of the set of blocks optimizes the number of location data points present in each block such that the empty space present in each block will be removed.

In one example, say there are 22 location data points present in the block A. In order to perform the reconfiguration, the system 102 may determine the centroid of the 22 location data points. Further, the system 102 may create a diagonal A and a diagonal B through the centroid. In the example, the defined block area may be 16 Km². Further, a distance of each side of each block may be 4 KM. Hence, the diagonal A and the diagonal B of 5.6 KM may be created. Further, the end points of the diagonals may be connected to create the reconfigured block.

Figure 4A:
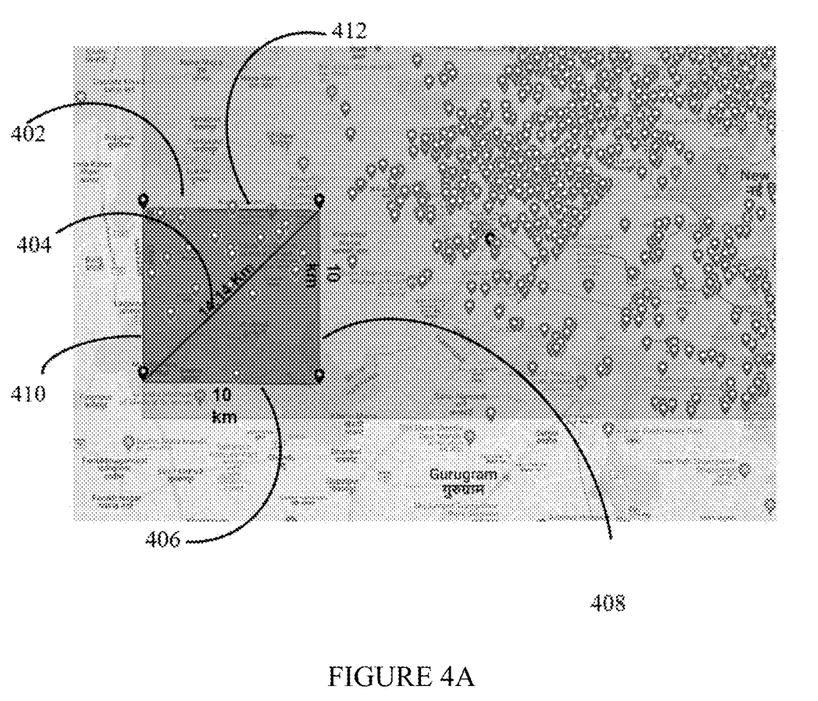
FIG. 4A shows reconfiguration of each block from a set of blocks, in accordance with an embodiment of the present subject matter.

Referring now to FIG. 4A, reconfiguration of each block from a set of blocks is shown, in accordance with an embodiment of the present subject matter. In one embodiment, assume 17 location data points in the block 302. Further, a centroid of the 17 location data points. Further, a hypotenuse 404 may be created through the centroid based on the defined area. The hypotenuse 404 may be referred as a diagonal 404. The defined area may be 100 Km². Hence, the block may be having sides of 10 KM each. Further, the hypotenuse 404 may be 14.14 KM. Once the hypotenuse 404 is created, two sides 406 and 408 of the block are created. Furthermore, the other two sides 410 and 412 of the block may be created based on the hypotenuse 404. The sides 406, 408, 410 and 412 may be of 10 KM each. Upon creation of the sides, the reconfigured block 402 may be created.

Referring again to FIG. 1, upon reconfiguration, the system 102 may mark each of the reconfigured set of blocks as one of a fixed block or a floating block. The reconfigured set of blocks may be marked using an 80-20 hypothesis technique in order to generate a set of fixed blocks and a set of floating blocks. In an aspect, the 80-20 hypothesis technique may indicate 20% of the blocks from the set of blocks are marked as the fixed block. Further, the 80% blocks from the set of blocks may be marked as the floating block. The 80-20 hypothesis may be referred as a pareto technique. In one embodiment, the set of fixed blocks may comprise 80% of the location data point from the set of location data points, and the set of floating blocks may comprises 20% of the location data points from the set of location data points. In one embodiment, the fixed block may be a cluster which will get rebalanced by adding the floating block into the fixed block. In the embodiment, the floating block may be a temporary block which will either get added to the fixed block, or will be converted into as the fixed block.

In one exemplary embodiment, assume there are 10 blocks in the set of reconfigured blocks referred as a block-1, block-2, . . . block-10. Further, the block-1 may comprise 43 number of location data points, block-2 may comprise 31 number location data points, block-3 may comprise 28 number of location data points, block-4 may comprise 17 location data points, block-5 may comprise 13 location data points, . . . block-10 may comprise 2 location data points. Further, the system 102 may use the 80-20 hypothesis technique to mark the 10 blocks. The system 102 may mark block-1 and block-2 as the fixed blocks. Further, the system 102 may mark the block-3, block-4, . . . block-10 as the floating blocks.

Subsequently, the system 102 may create a plurality of clusters in the area based on iteratively adjusting each floating block of the set of floating blocks. The plurality of clusters may be created either by merging a floating block with one of a fixed block, or by remarking the floating block as the fixed block. The iterative adjustment may happen until all the floating blocks are either merged or remarked. In one embodiment, only one floating block will get either merged or remarked. In one aspect, the plurality of clusters may comprise a gap in between multiple clusters. The plurality of clusters may be non-overlapping. The plurality of clusters may comprise optimized number of location data points. Each cluster from the plurality of cluster may be having an area equal to the defined block area. The number of location data points in each cluster may vary.

In one embodiment, the plurality of clusters may be created by merging the floating block from the set of floating blocks with one of the fixed block. The floating block may be merged with the fixed block based on the latitude and the longitude of the location data points present in the floating block. The system 102 may check the latitude and longitude of each location data points in the floating block. Further, the system 102 may check if the location data point is nearest to a boundary of the fixed block based on the latitude and the longitude. Furthermore, the system 102 may change the boundaries of the fixed block in such a way that the fixed block will cover the location data points from the floating block. The changing of the boundaries of the fixed block may depend on the defined block area. The changing of the boundaries to cover the location data points of the floating block may be referred as the merging of the floating block with the fixed block.

In another embodiment, the plurality of clusters may be created by re-marking the floating block as the fixed block when the merging of the floating block with the fixed block exceeds the defined block area. The system 102 may check if the merging of the floating block with the fixed block is increasing the defined block area. In case of the increase in the defined block area, the system 102 may remark the floating block as the fixed block.

In one exemplary embodiment, assume a block A as a fixed block comprising 28 location data points, and a block B as a floating block comprising 5 location data points. The system 102 may check the latitude and the longitude of the 5 location data points present in the floating block. Further, if the latitude and the longitude indicates that 3 location data points are nearest to a boundary of the block A. The system 102 may further shift the boundaries of the block A in order to cover the 3 location data points of the floating block. While shifting the boundaries, the system 102 may check that the defined block area of the block A will not increase. In an example, the defined block area may be 16 Km². The system 102 may check that the area of the block A remains 16 Km² upon shifting of the boundaries. If the area of the block A is exceeding the defined block area i.e., 16 Km². The system 102 may remark the floating block i.e., the block B as the fixed block.

Figure 3B:
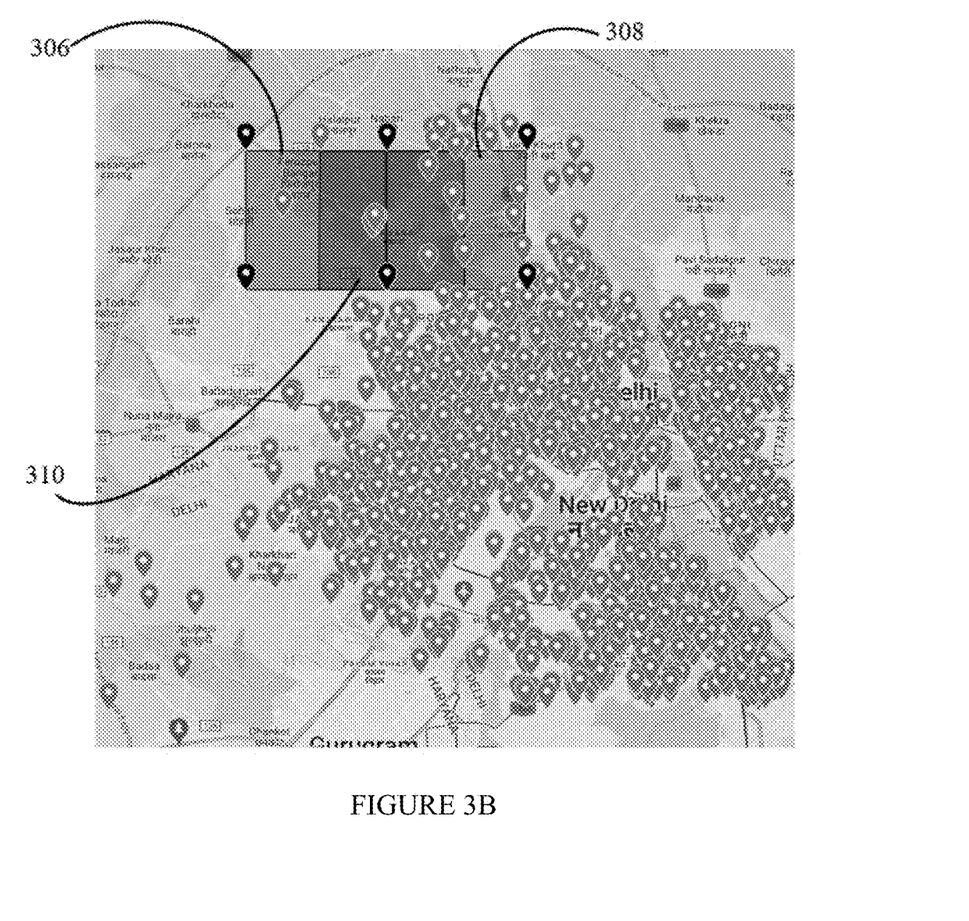
FIG. 3B shows merging of a floating block with a fixed block, in accordance with an embodiment of the present subject matter.

Referring now to FIG. 3B, merging of the floating block with the fixed block is shown in accordance with an embodiment of the present subject matter. In an embodiment, construe block 306 as a floating block, and block 308 as a fixed block. The system 102 may check there is an empty space in the block 308. comprises empty space along with the location data points. Further, the system 102 may check the latitude and longitude of the location data points present in the block 306. Furthermore, the system 102 may identify 3 location data points nearest to a boundary of the block 308. Subsequently, the system 102 may merge the floating block 306 into the fixed block 308 by changing the boundaries of the block 308. Based on changing the boundaries, the system 102 may create a cluster 310 as a final cluster.

Figure 4B:
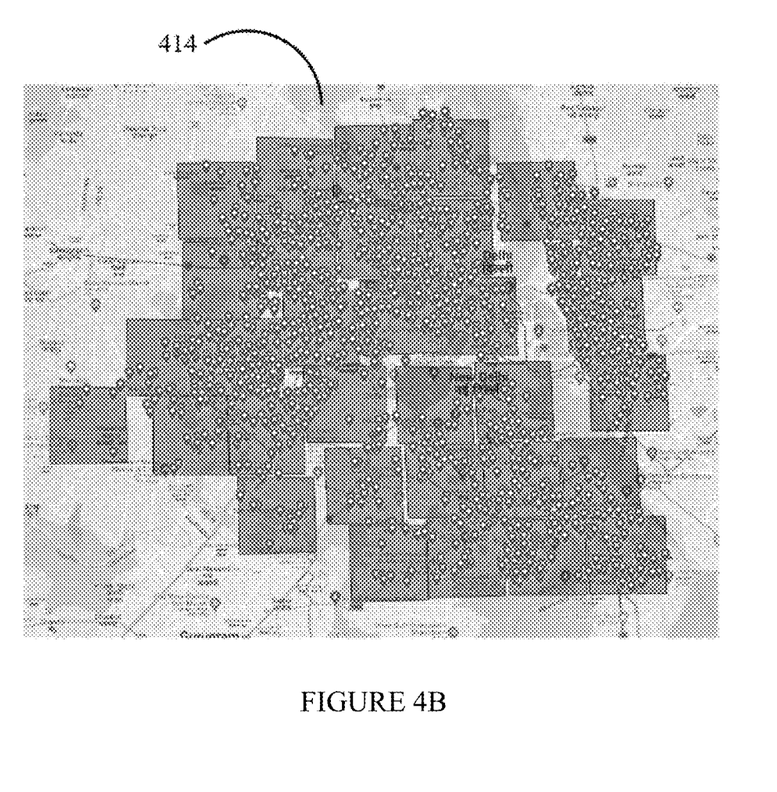
FIG. 4B shows a plurality of clusters created in an area, in accordance with an embodiment of the present subject matter.

Referring now to FIG. 4B, a plurality of clusters created in an area is shown, in accordance with an embodiment of the present subject matter. In an embodiment, the plurality of clusters 414 created in the area may be shown. Each cluster from the plurality of clusters may be having same area. Further, there exists gaps between the plurality of clusters. In an aspect, the plurality of clusters may be non-overlapping.

Referring again to FIG. 1, in one embodiment, the system 102 may calculate a haversine distance of the set of location data points from a centroid of an area. The haversine distance may be referred as an angular distance. The angular distance may be calculated using at least Haversine distance formula, Euclidian distance formula, and Vincenty Formula. It may be noted that the angular distance between two location data points, present on the earth or a sphere, may calculated based on the longitudes and latitudes of two location data points. In an example, consider there are 100 location data points. The system may calculate angular distance between each location data point and the centroid. The system may calculate 100 angular distances in real time. In another embodiment, let us assume that the centroid is an actual location data point, in that scenario the system may calculate 99 angular distances.

Subsequently, the system 102 may also compute an average angular distance between the plurality of location data points from the centroid. Further, the system 102 may determine a minimum outlier threshold by identifying a number of points having the angular distance greater than a defined average angular distance. It may be noted that the defined average angular distance may be calculated automatically or manually. In another embodiment, the user may define the defined average angular distance in multiples of average angular distance.

In the above example, let us assume that the average angular distance between 100 location data points is 5. Further, let us assume that the threshold average angular distance is 10. Further, the system identifies a number of points having the angular distance greater than a threshold average angular distance (10). Let us assume that the angular distance of 15 points is greater than 10. The system may define 15 as the minimum outlier threshold.

Figure 5:
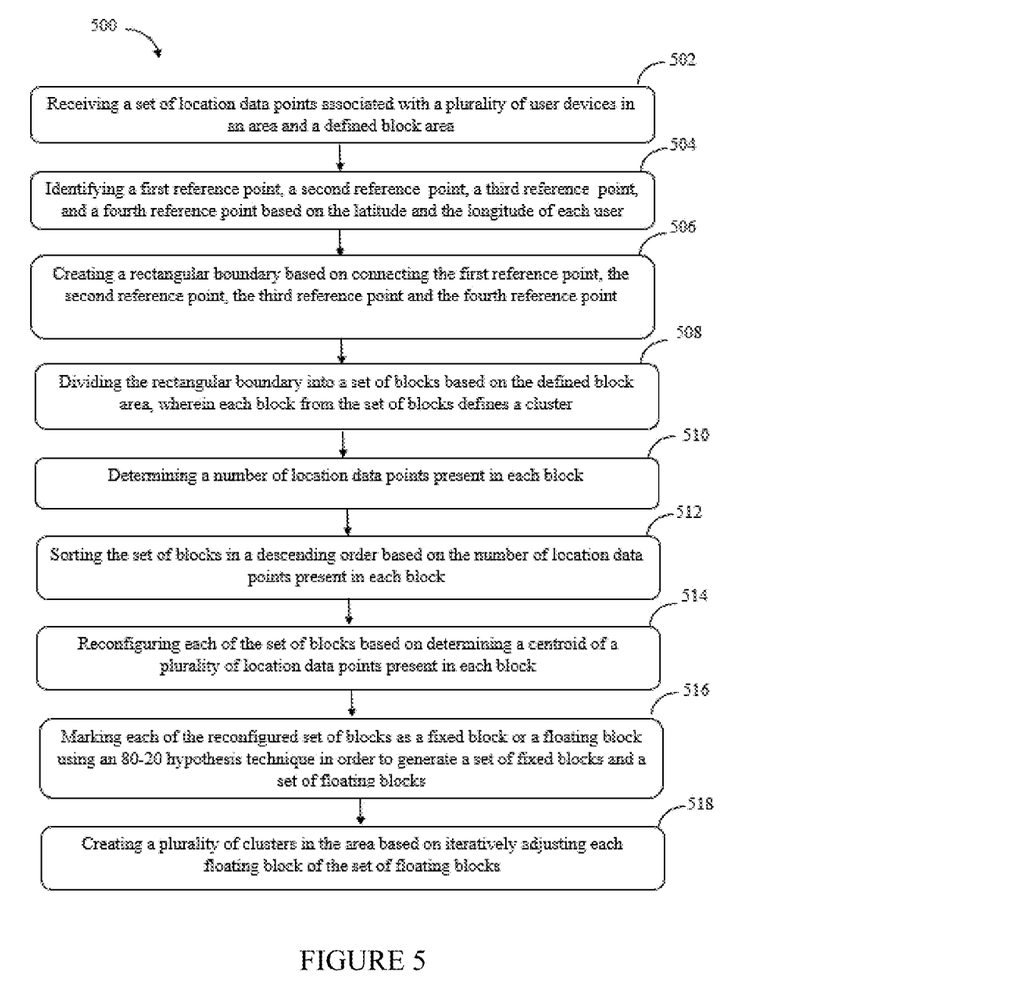
FIG. 5 illustrates a method for creating clusters in an area, in accordance with an embodiment of the present subject matter.

Referring now to FIG. 5, a method 500 for creating clusters in an area is shown, in accordance with an embodiment of the present subject matter. The method 500 may be described in the general context of computer executable instructions. Generally, computer executable instructions can include routines, programs, objects, components, data structures, procedures, modules, functions, etc., that perform particular functions or implement particular abstract data types.

The order in which the method 500 is described is not intended to be construed as a limitation, and any number of the described method blocks can be combined in any order to implement the method 500 or alternate methods for creating clusters in an area. Additionally, individual blocks may be deleted from the method 500 without departing from the scope of the subject matter described herein. Furthermore, the method 500 for creating clusters in an area can be implemented in any suitable hardware, software, firmware, or combination thereof. However, for case of explanation, in the embodiments described below, the method 500 may be considered to be implemented in the above-described system 102.

At block 502, a set of location data points associated with a plurality of user devices in an area and a defined block area may be received. In an aspect, each location data point may comprise a latitude value and a longitude value of each user device of the plurality of user devices.

At block 504, a first reference point, a second reference point, a third reference point, and a fourth reference point may be identified based on the latitude value and the longitude value of each user device.

At block 506, a rectangular boundary may be created based on connecting the first reference point, the second reference point, the third reference point and the fourth reference point. In an aspect, the rectangular boundary may enclose the set of location data points.

At block 508, the rectangular boundary may be divided into a set of blocks based on the defined block area. In an aspect, each block from the set of blocks may define a cluster.

At block 510, a number of location data points present in each block may be determined.

At block 512, the set of blocks may be sorted in a descending order based on the number of location data points present in each block.

At block 514, each of the set of blocks may be reconfigured based on determining a centroid of a plurality of location data points present in each block. In an aspect, the centroid may be a point at center of each block.

At block 516, each of the reconfigured set of blocks may be marked as a fixed block or a floating block using an 80-20 hypothesis technique in order to generate a set of fixed blocks and a set of floating blocks.

At block 518, a plurality of clusters in the area may be created based on iteratively adjusting each floating block of the set of floating blocks by one of: merging a floating block from the set of floating blocks with one of a fixed block based on the latitude value and the longitude value of the location data points present in the floating block; or re-marking the floating block as the fixed block when the merging of the floating block with the fixed block exceeds the defined block area.

Exemplary embodiments discussed above may provide certain advantages. Though not required to practice aspects of the disclosure, these advantages may include those provided by the following features.

Some embodiments of the system and the method enables creating equal area clusters in an area.

Some embodiments of the system and the method enables determining outliers in the area.

Some embodiments of the system and the method enables creating optimized number of clusters in an area.

Some embodiments of the system and the method enables redefining the clusters to comprise maximum number of location data points.

Some embodiments of the system and the method enables receiving feedback from the user to continuously train Machine Learning Algorithms to efficiently compute an area of cluster.

Although implementations for methods and system for creating clusters in an area have been described in language specific to structural features and/or methods, it is to be understood that the appended claims are not necessarily limited to the specific features or methods described. Rather, the specific features and methods are disclosed as examples of implementations for creating clusters in an area.

The invention claimed is:

1. A method to create non-overlapping clusters in an area to facilitate customer segmentation and distribution within the area to optimize logistic operations, the method comprises:

receiving, by a processor, a set of location data points associated with a plurality of user devices in an area and a defined block area, wherein each location data point comprises a latitude value and a longitude value indicating geographic coordinates of each user device;

identifying, by the processor, at least two reference points from the set of location data points, wherein a first reference point of the at least two reference points has one of following combinations:

minimum latitude value and minimum longitude value,
maximum latitude value and minimum longitude value,
minimum latitude value and maximum longitude value,
maximum latitude value and maximum longitude value, and wherein a second reference point of the at least two reference points has opposite combination of latitude and longitude values from the first reference point, ensuring that the first and second reference points are diagonally opposite corners of a rectangular geographic boundary;

using the identified first and second reference points to define four corners of the rectangular geographic boundary;

determining, by the processor, remaining two corners of the rectangular geographic boundary by:

combining the latitude value of the first reference point with the longitude value of the second reference point to determine a third corner of the rectangular geographic boundary;

combining the latitude value of the second reference point with the longitude value of the first reference point to determine a fourth corner of the rectangular geographic boundary;

dividing, by the processor, the rectangular geographic boundary into a set of blocks based on the defined block area;

determining, by the processor, a number of location data points present in each block;

sorting, by the processor, the set of blocks in a descending order based on the number of location data points present in each block;

determining, by the processor, a centroid of a plurality of location data points present in a block of the set of blocks, wherein the centroid is a point at center of the block;

reconfiguring, by the processor, the block to adjust boundaries of the block to remove an empty space from the block to form a reconfigured block, wherein the reconfigured block is based on the centroid and distribution of the location data points associated with each block from the set of blocks;

marking, by the processor, the reconfigured block from the set of blocks as a fixed block or a floating block using an 80-20 hypothesis technique in order to generate a set of fixed blocks and a set of floating blocks; and creating, by the processor, a plurality of non-overlapping clusters in the area by iteratively adjusting the floating block of the set of floating blocks by one of:

merging the floating block from the set of floating blocks with one of the fixed block based on the latitude value and the longitude value of the location data points present in the floating block; and re-marking the floating block as the fixed block when the merging of the floating block with the fixed block exceeds the defined block area, wherein the plurality of non-overlapping clusters facilitates customer segmentation and distribution within the area to optimize logistic operations within the area.

2. The method as claimed in claim 1, wherein the set of floating blocks is adjusted until each floating block is removed.

3. The method as claimed in claim 1, wherein the number of location data points is determined by analysis of the location data points in the block having the latitude value between the minimum latitude value and the maximum latitude value, and the longitude value between the minimum longitude value and the maximum longitude value.

4. The method as claimed in claim 1, wherein reconfiguring the block comprises:

determining the centroid of the plurality of location data points present in the block, wherein the centroid of the plurality of location data points is determined using a haversine distance function, a Road Distance function or a Euclidean algorithm;

creating diagonals through the centroid; and reconfiguring the block based on the diagonals and the defined block area.

5. The method as claimed in claim 1, wherein the 80-20 hypothesis technique indicates 20% of the blocks from the set of blocks are marked as the fixed block, and the 80% blocks from the set of blocks are marked as the floating block.

6. The method as claimed in claim 1, wherein the fixed blocks comprise 80% of the location data point, and the floating blocks comprises 20% of the location data points.

7. The method as claimed in claim 1, comprises determining an average haversine distance by identifying one or more location points having the average haversine distance greater than a defined average haversine distance, and wherein the one or more location data points are defined as a minimum outlier threshold.

8. The method as claimed in claim 1, wherein merging the floating block with one of the fixed blocks comprises:

checking if the location data point present in the floating block is adjacent to a boundary of the fixed block based on the latitude value and the longitude value; and adjusting at least a boundary of the fixed block such that the fixed block occupies the location data point present in the floating block, wherein adjusting the boundary of the fixed block depends on the defined block area.

9. A system to create clusters in an area, the system comprising:
   a memory; and
   a processor coupled to the memory, wherein the processor is configured to execute instructions stored in the memory to:
   receive a set of location data points associated with a plurality of user devices in an area and a defined block area, wherein each location data point comprises a latitude value and a longitude value indicating geographic coordinates of each user device;
   identifying at least two reference points from the set of location data points, wherein a first reference point of the at least two reference points has one of following combinations:
     minimum latitude value and minimum longitude value,
     maximum latitude value and minimum longitude value,
     minimum latitude value and maximum longitude value,
     maximum latitude value and maximum longitude value, and
   wherein a second reference point of the at least two reference points has opposite combination of latitude and longitude values from the first reference point, ensuring that the first and second reference points are diagonally opposite corners of a rectangular geographic boundary;
   using the identified first and second reference points to define four corners of the rectangular geographic boundary;
   determining remaining two corners of the rectangular geographic boundary by:
     combining the latitude value of the first reference point with the longitude value of the second reference point to determine third corner of the rectangular geographic boundary;
   combining the latitude value of the second reference point with the longitude value of the first reference point to determine fourth corner of the rectangular geographic boundary;
   divide the rectangular geographic boundary into a set of blocks based on the defined block area;
   determine a number of location data points present in each block;
   sort the set of blocks in a descending order based on the number of location data points present in each block;
   determine a centroid of a plurality of location data points present in a block of the set of blocks, wherein the centroid is a point at center of the block;
   reconfigure the block to adjust boundaries of the block to remove an empty space from the block to form a reconfigured block, wherein the reconfigured block is based on the centroid, and distribution of the location data points associated with each block from the set of blocks;
   mark the reconfigured block from the set of blocks as a fixed block or a floating block using an 80-20 hypothesis technique in order to generate a set of fixed blocks and a set of floating blocks; and
   create a plurality of non-overlapping clusters in the area by iteratively adjusting each floating block of the set of floating blocks by one of:
     merging a floating block from the set of floating blocks with one of a fixed block based on the latitude value and the longitude value of the location data points present in the floating block; and
     re-marking the floating block as the fixed block when the merging of the floating block with the fixed block exceeds the defined block area, wherein the plurality of non-overlapping clusters facilitates customer segmentation and distribution within the area to optimize logistic operations within the area.

10. The system as claimed in claim 9, wherein the set of floating blocks is adjusted until each floating block is removed.

11. The system as claimed in claim 9, wherein the number of location data points is determined by analysis of the location data points in the block having the latitude value between the minimum latitude value and the maximum latitude value, and the longitude value between the minimum longitude value and the maximum longitude value.

12. The system as claimed in claim 9, wherein reconfiguring the block comprises:
   determining the centroid of the plurality of location data points present in the block, wherein the centroid of the plurality of location data points is determined using one of a haversine distance function, a Road Distance function or a Euclidean algorithm;
   creating diagonals through the centroid; and
   reconfiguring the block based on the diagonals and the defined block area.

13. The system as claimed in claim 9, wherein the 80-20 hypothesis technique indicates 20% of the blocks from the set of blocks are marked as the fixed block, and the 80% blocks from the set of blocks are marked as the floating block.

14. The system as claimed in claim 9, wherein the fixed blocks comprise 80% of the location data point, and the floating blocks comprises 20% of the location data points.

15. The system as claimed in claim 9, comprises determining an average haversine distance by identifying one or more location points having the average haversine distance greater than a defined average haversine distance, and wherein one or more location data points are defined as a minimum outlier threshold.

16. The system as claimed in claim 9, wherein merging the floating block with one of the fixed blocks comprises:
   checking if the location data point present in the floating block is adjacent to a boundary of the fixed block based on the latitude value and the longitude value; and
   adjusting at least a boundary of the fixed block such that the fixed block occupies the location data point present in the floating block, wherein adjusting the boundary of the fixed block depends on the defined block area.

* * * * *